US012728351B2

(12) United States Patent
Okamura

(10) Patent No.: US 12,728,351 B2
(45) Date of Patent: Sep. 8, 2026

(54) NON-TRANSITORY COMPUTER-READABLE STORAGE MEDIUM HAVING DATA EDITING PROGRAM STORED THEREIN, DATA EDITING SYSTEM, DATA EDITING METHOD, AND DATA EDITING APPARATUS

(71) Applicant: Nintendo Co., Ltd., Kyoto (JP)

(72) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 332 days.

(21) Appl. No.: 18/395,183

(22) Filed: Dec. 22, 2023

(65) Prior Publication Data

US 2025/0060946 A1 Feb. 20, 2025

(30) Foreign Application Priority Data

Aug. 16, 2023 (JP) ................................ 2023-132595

(51) Int. Cl.

| | |
|---|---|
| ***G06F 8/34*** | (2018.01) |
| ***A63F 13/60*** | (2014.01) |
| ***A63F 13/69*** | (2014.01) |
| ***G06F 3/04847*** | (2022.01) |
| *A63F 13/63* | (2014.01) |
| *G06F 11/20* | (2006.01) |

(52) U.S. Cl.

CPC .............. *A63F 13/60* (2014.09); *A63F 13/69* (2014.09); *G06F 3/04847* (2013.01); *G06F 8/34* (2013.01); *A63F 13/63* (2014.09); *G06F 11/2023* (2013.01)

(58) Field of Classification Search

CPC ....... A63F 13/69; A63F 13/60; G06F 11/2023
See application file for complete search history.

(56) References Cited

U.S. PATENT DOCUMENTS

2002/0161889 A1* 10/2002 Gamache ............ G06F 11/2023 709/226

OTHER PUBLICATIONS

KR 100295725, (translation), Aug. 7, 2001, 15 pgs <KR_100295725.pdrf>.*

Harald et al, DE 102016101979, Aug. 10, 2017, 7 pgs <DE_102016101979.pdf>.*

Sui, Peng-fei, CN 115328880, (translation) Mar. 24, 2023, 11 pgs <CN_115328880.pdf>.*

"Nodes", Epic Games, retrieved on Dec. 22, 2023, 14 pages, https://docs.unrealengine.com/4.27/en-US/ProgrammingAndScripting/Blueprints/UserGuide/Nodes/.

(Continued)

*Primary Examiner* — Tuan A Vu

(74) *Attorney, Agent, or Firm* — Nixon & Vanderhye PC

(57) ABSTRACT

A UI of a node editor for performing setting for elements included in a game is presented. On the basis of an operation input to the node editor, a first group including at least one node is created, and a second group obtained by copying the first group as a copy source and including a node and connection information respectively corresponding to the node and the connection information of the node included in the first group is created. When a first edit is performed on the first group, the first edit is further reflected in the second group at a predetermined timing, and when a second edit is performed on the second group, an edited content is further changed to a state where the first edit is not reflected thereafter.

28 Claims, 15 Drawing Sheets

(56) References Cited

OTHER PUBLICATIONS

Mikito Yoshitani, "Introduction to Unity2021 3D/2D Game Development Practice, 1st Edition," Introduction to Unity2021Unity2021 3D/2D Game Development Practice, 1st Edition (Jun. 25, 2021), Nihon, 016,024,047, pp. 1-17.

Tetsuya Mori, "Unity Game Programming Bible 2nd Generation, First Edition," Unity Game Programming Bible 2nd Generation, First Edition (Jun. 25, 2021), Japan, pp. 1-22.

* cited by examiner

F I G. 4
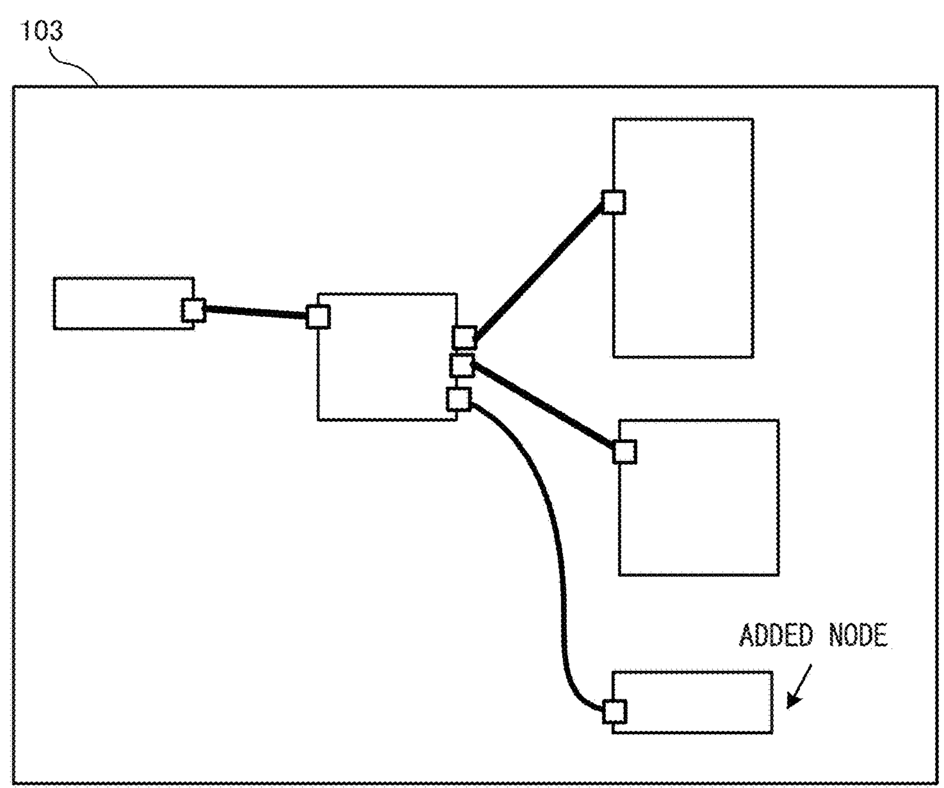
F I G. 5
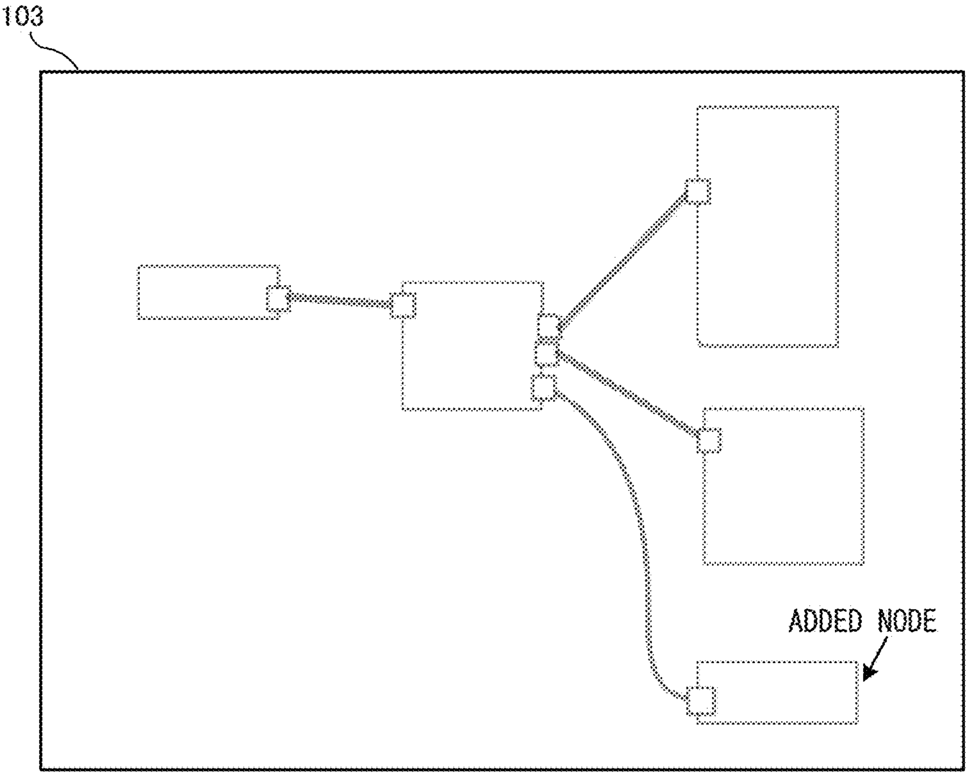

F I G. 7
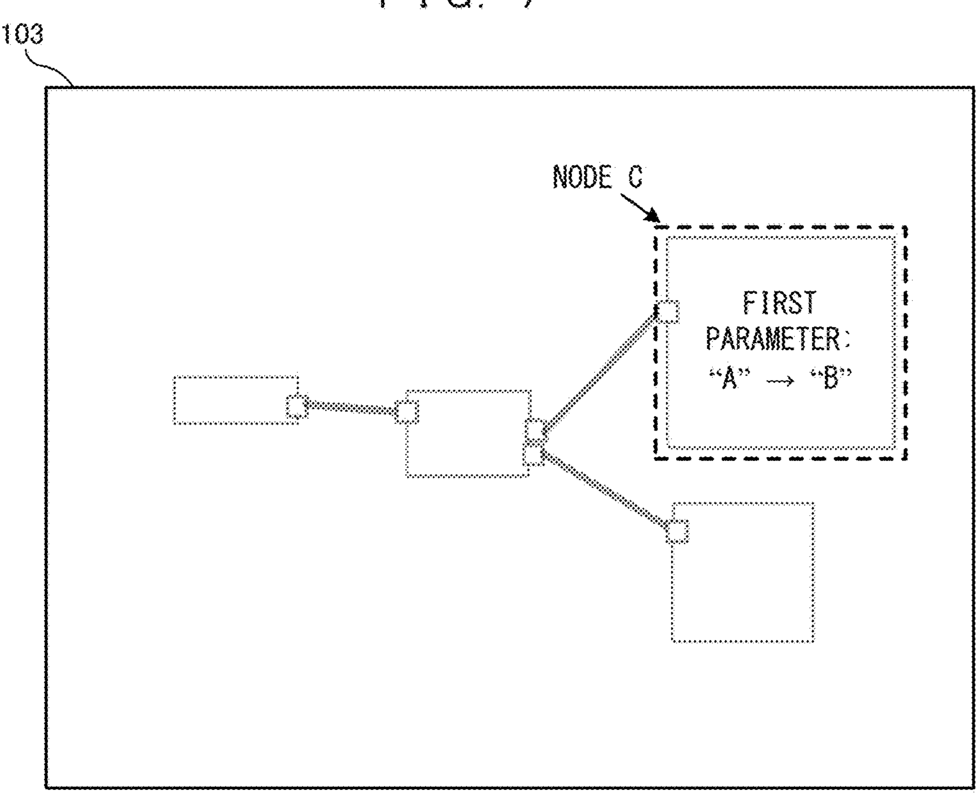
F I G. 8
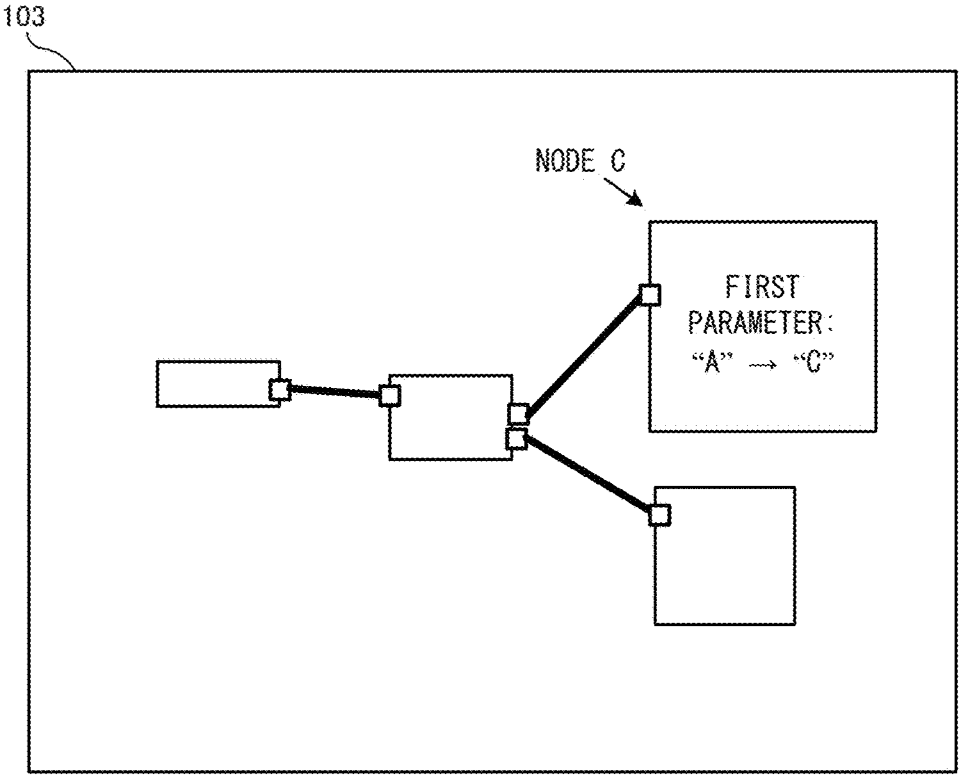

F I G. 1 1
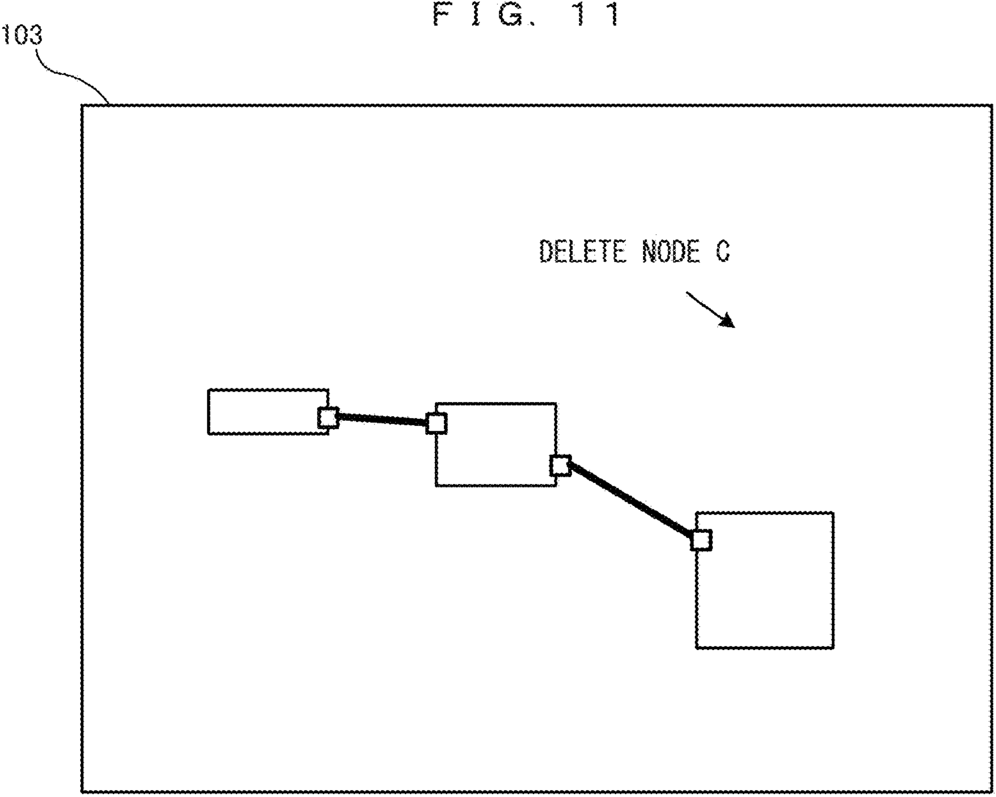
F I G. 1 2
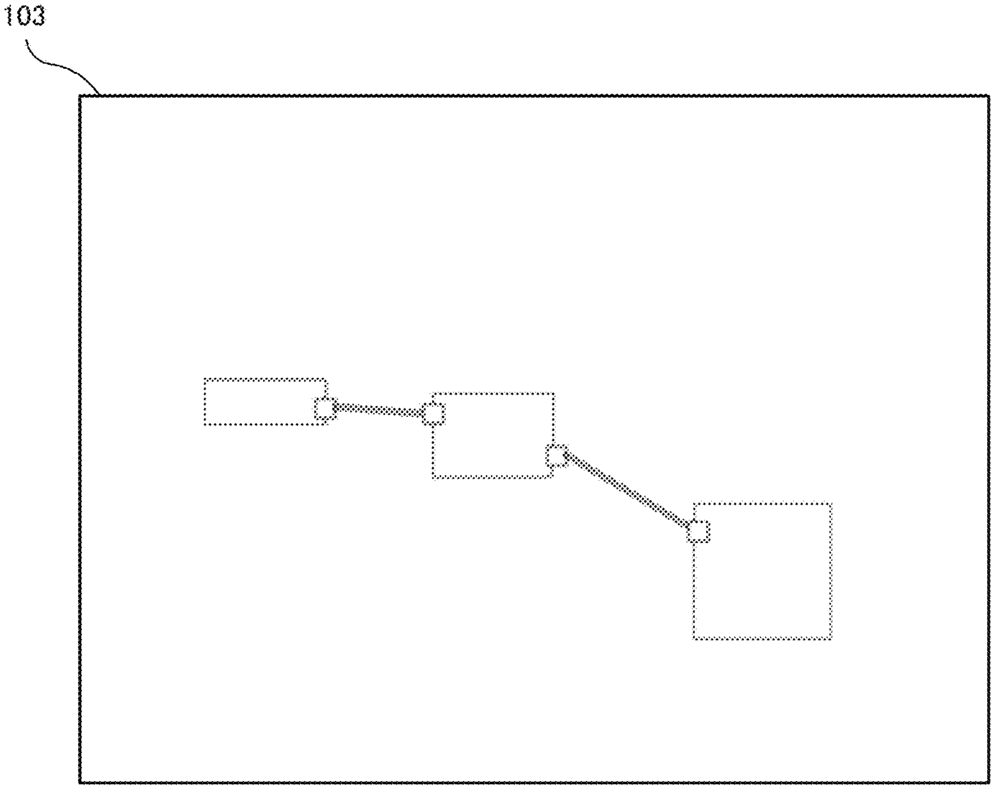

FIG. 13
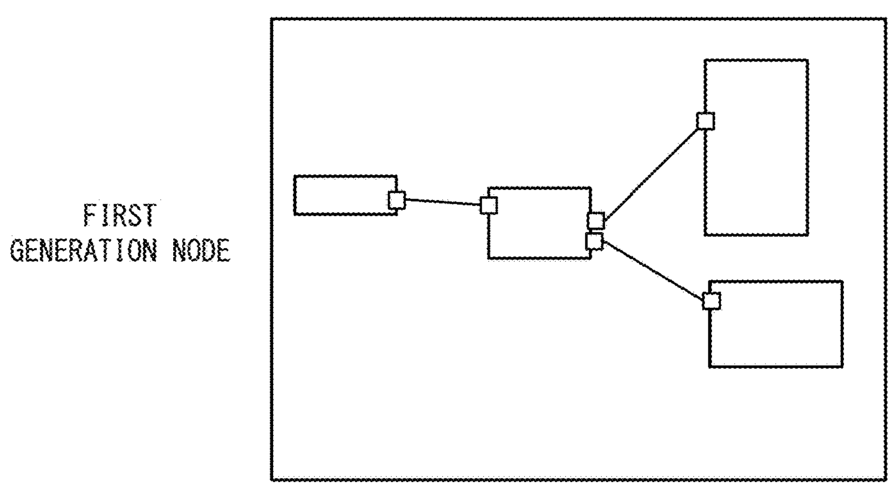
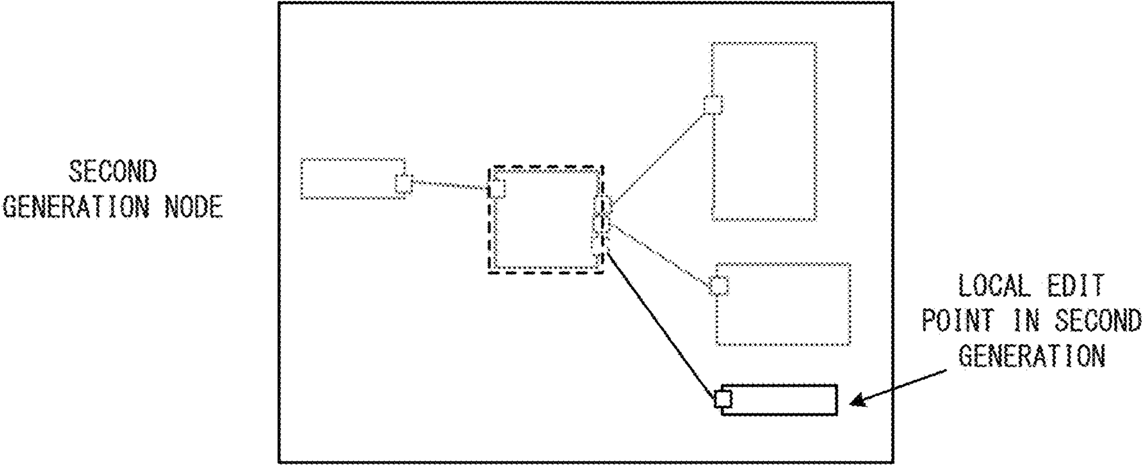
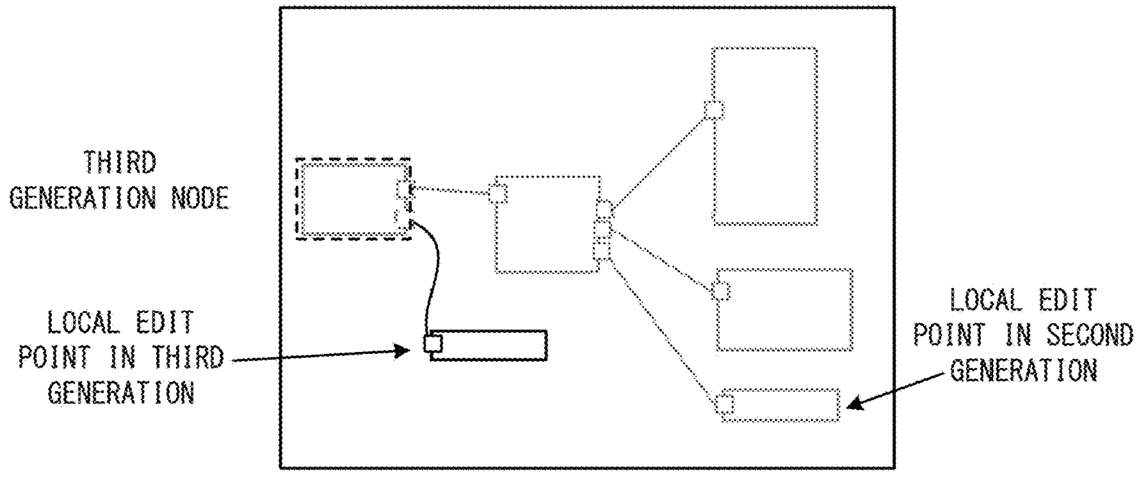

304

| COMPONENT ID (311) | CONFIGURATION TYPE (312) | DETAILED INFORMATION (313) |
|---|---|---|
| 00112233 | NODE | ・・・ |
| 00112244 | PLUG | ・・・ |
| 00112255 | CONNECTION LINE | ・・・ |
| 00112255 | GROUP | ・・・ |
| 00112255 | LINK TYPE | ・・・ |
| ⋮ | ⋮ | ⋮ |

Figures 16, 17:
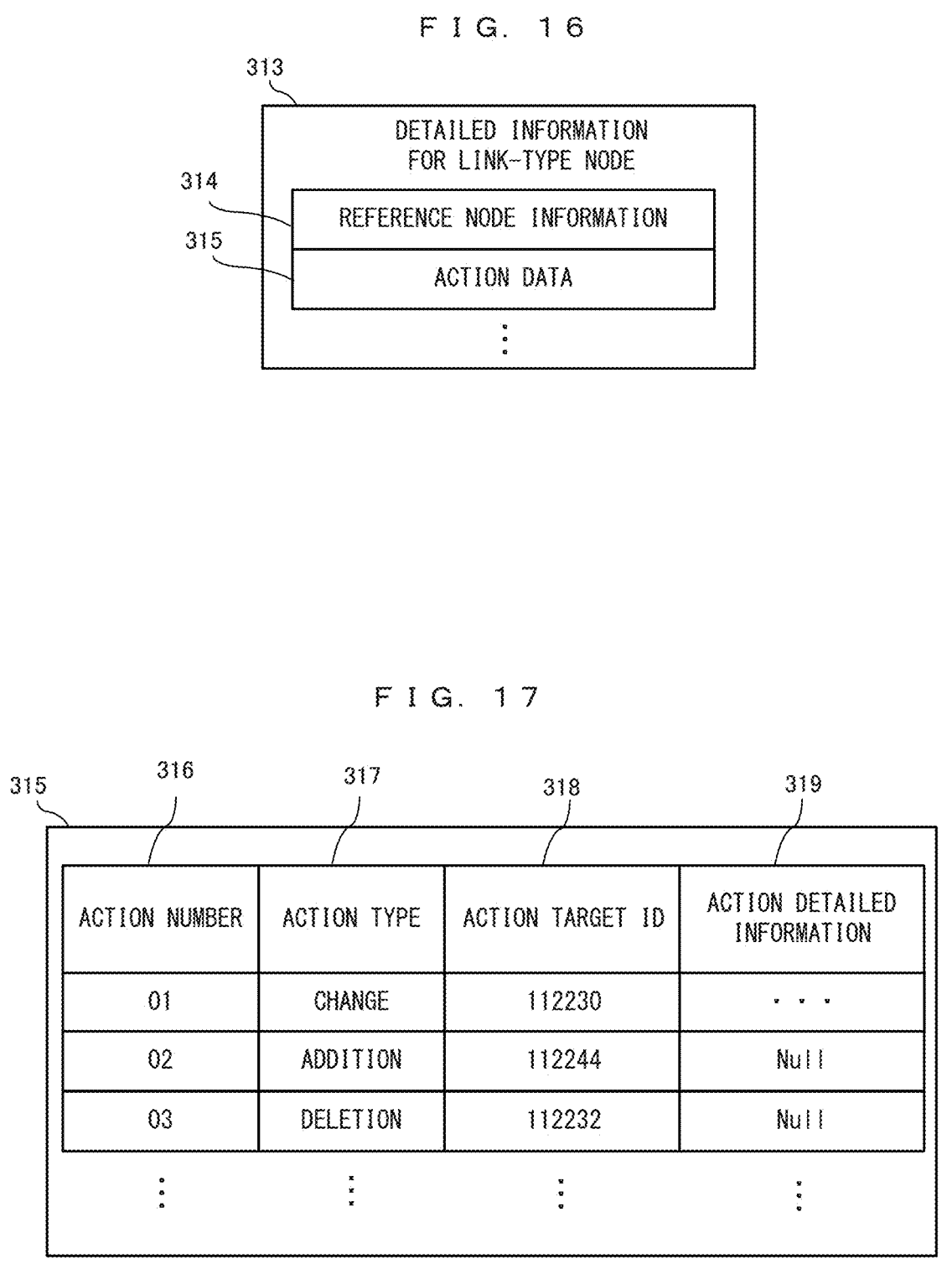

| ACTION NUMBER (316) | ACTION TYPE (317) | ACTION TARGET ID (318) | ACTION DETAILED INFORMATION (319) |
|---|---|---|---|
| 01 | CHANGE | 112230 | ・・・ |
| 02 | ADDITION | 112244 | Null |
| 03 | DELETION | 112232 | Null |
| ⋮ | ⋮ | ⋮ | ⋮ |

| RENDERING ELEMENT ID | RENDERING TYPE | RENDERING ELEMENT DETAILED INFORMATION |
|---|---|---|
| 00112233 | NODE | ・・・ |
| 00112244 | PLUG | ・・・ |
| 00112255 | CONNECTION LINE | ・・・ |
| 00112255 | NODE | ・・・ |
| 00112255 | CONNECTION LINE | ・・・ |
| 00112244 | PLUG | ・・・ |

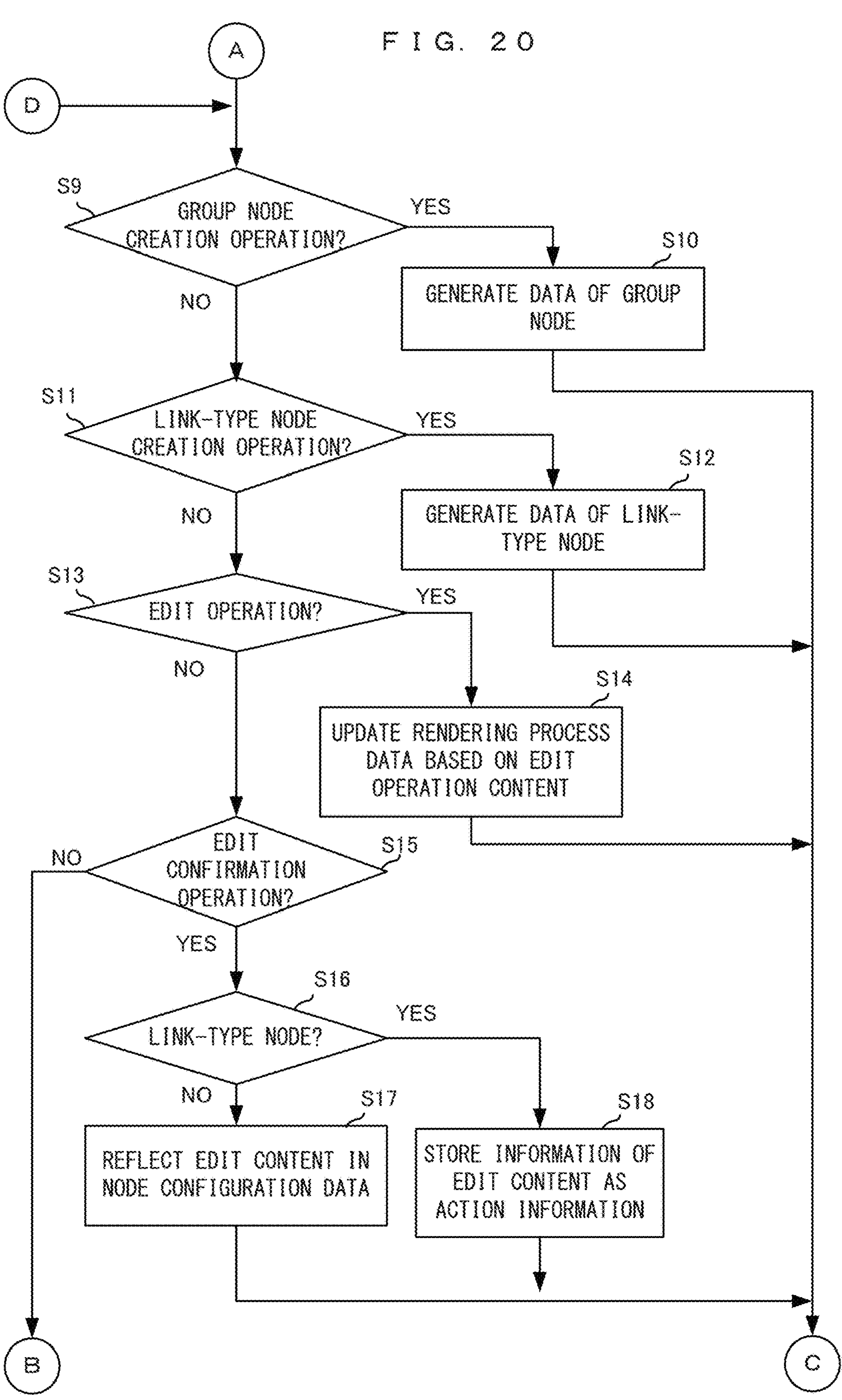
F I G. 20
A
D
S9
GROUP NODE CREATION OPERATION?
YES
NO
S10
GENERATE DATA OF GROUP NODE
S11
LINK-TYPE NODE CREATION OPERATION?
YES
NO
S12
GENERATE DATA OF LINK-TYPE NODE
S13
EDIT OPERATION?
YES
NO
S14
UPDATE RENDERING PROCESS DATA BASED ON EDIT OPERATION CONTENT
S15
EDIT CONFIRMATION OPERATION?
NO
YES
S16
LINK-TYPE NODE?
YES
NO
S17
REFLECT EDIT CONTENT IN NODE CONFIGURATION DATA
S18
STORE INFORMATION OF EDIT CONTENT AS ACTION INFORMATION
B
C F I G. 2 1
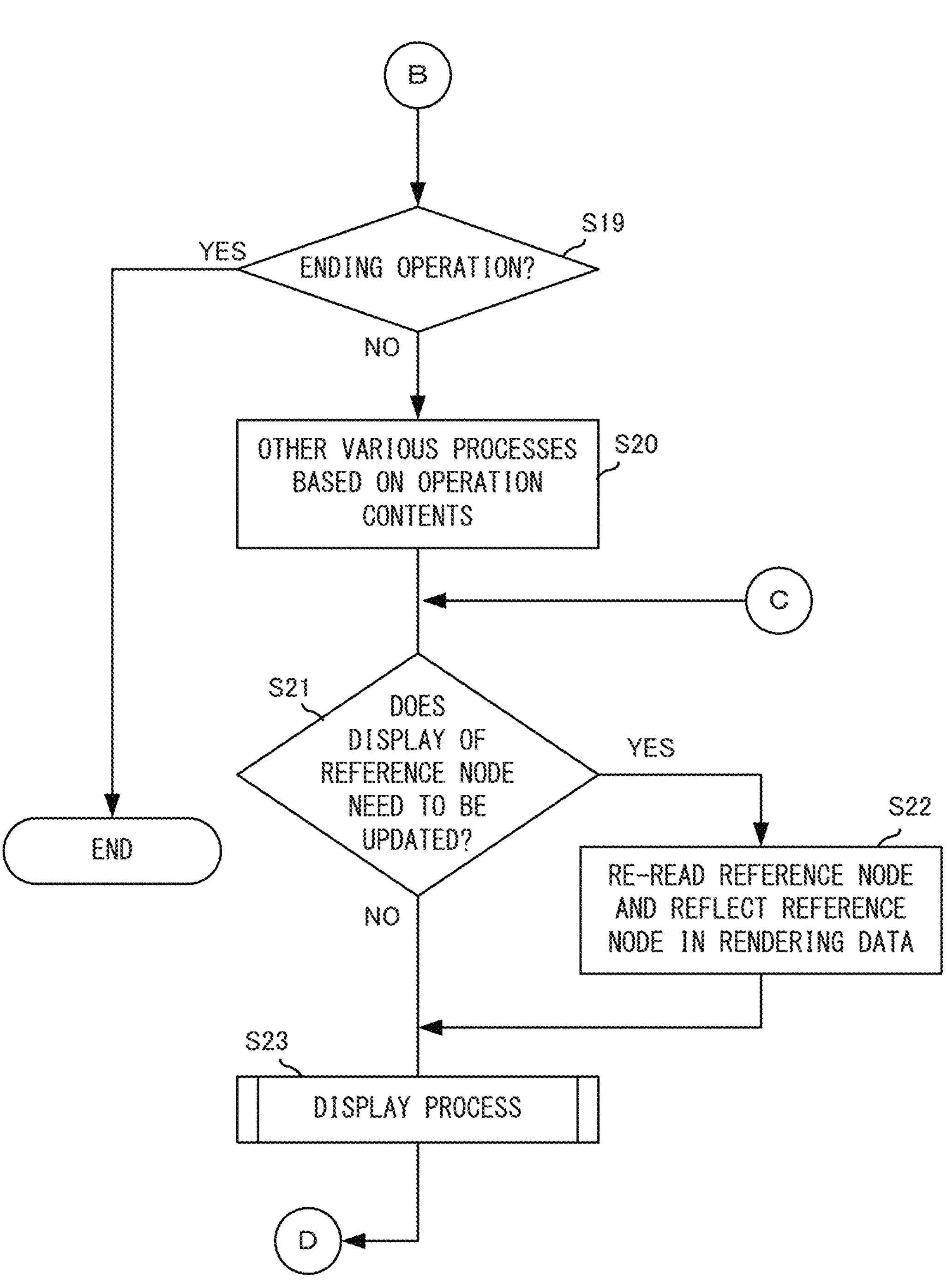

F I G. 2 2
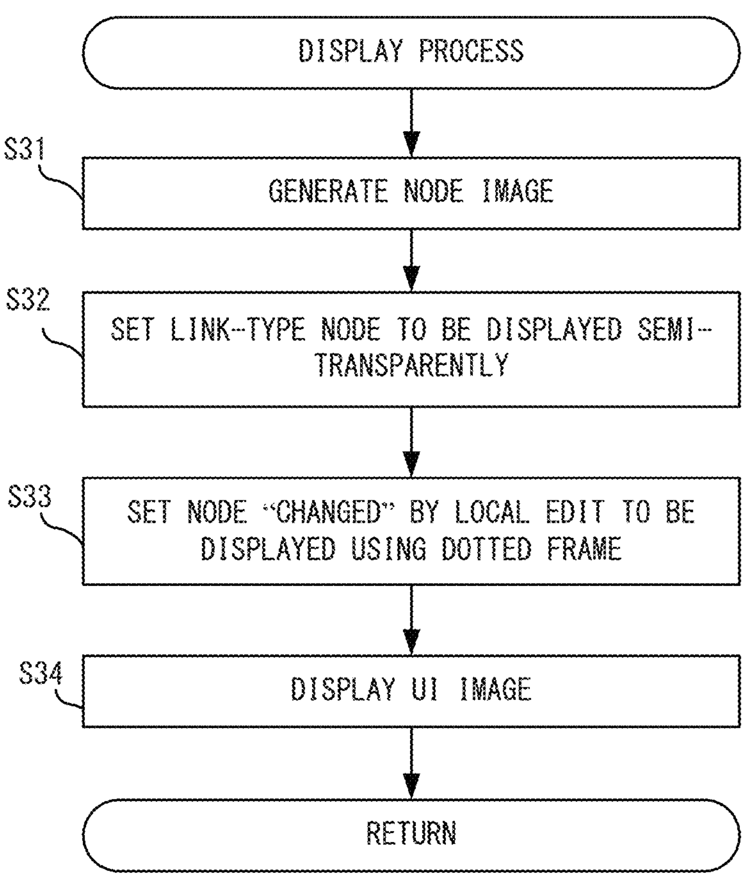

NON-TRANSITORY COMPUTER-READABLE STORAGE MEDIUM HAVING DATA EDITING PROGRAM STORED THEREIN, DATA EDITING SYSTEM, DATA EDITING METHOD, AND DATA EDITING APPARATUS

CROSS REFERENCE TO RELATED APPLICATION

This application claims priority to Japanese Patent Application No. 2023-132595 filed on Aug. 16, 2023, the entire contents of which are incorporated herein by reference.

FIELD

The present disclosure relates to a node editor for use in game development environments.

BACKGROUND AND SUMMARY

Hitherto, a node editor for use in game development environments has been known.

The above technology has provided an environment that facilitates game development. However, in this regard, for example, when it is desired to edit many objects that are desired to appear in a game, there is room for improvement to provide an environment that facilitates development by further reducing the time and effort required for such editing.

In view of the above, the following configuration examples are exemplified.

(Configuration 1)

Configuration 1 is directed to a non-transitory computer-readable storage medium having stored therein a data editing program causing a processor of an information processing apparatus to:

present a UI of a node editor for performing setting for elements included in a game under development; and on the basis of an operation input to the node editor, create a first group including at least one node, create a second group obtained by copying the first group as a copy source and including a node and connection information respectively corresponding to the node and the connection information of the node included in the first group, when a first edit is performed on the node or the connection information included in the first group, further reflect the first edit in the corresponding node or connection information included in the second group at a predetermined timing, and when a second edit is performed on the node or the connection information included in the second group, further change the edited node or connection information to a state where the first edit is not reflected thereafter.

According to the above configuration example, the edit on the first group as the copy source is also reflected in the second group as the copy destination. This allows many types of elements having common features to be adjusted all at once. In addition, when the second group is caused to have a feature independent of the first group by editing a part of the second group, the independent feature can be caused to remain regardless of whether or not the first group is subsequently edited. Therefore, edits can be performed efficiently for a large number of elements.

(Configuration 2)

In Configuration 2 based on Configuration 1 above, the data editing program may cause the processor to retain the node or the connection information included in the second group, as a content of an edit additionally performed on the node or the connection information included in the first group.

According to the above configuration example, the information of the first group as the copy source itself is not rewritten, but the content of the edit is retained as information of additional edit on the content of the first group. Accordingly, a state where the first edit is reflected if there is no second edit, and the first edit is not reflected if the second edit has been performed, can be realized.

(Configuration 3)

In Configuration 3 based on Configuration 2 above, the data editing program may cause the processor to, when an edit of deleting the node or the connection information included in the second group is performed on the basis of an operation input to the node editor, retain the deletion of the node or the connection information included in the second group, as the content of the edit additionally performed.

According to the above configuration example, the content of the edit specific to the second group can be reflected such that the node or the connection information remains in the first group but is deleted from the second group. Accordingly, flexible editing work, such as making slight modifications with the first group as a base, is enabled, thereby improving development efficiency.

(Configuration 4)

In Configuration 4 based on Configuration 2 above, the node may include a group, and the data editing program may cause the processor to, when an edit of adding a new node or connection information to the second group is performed on the basis of an operation input to the node editor, retain addition of the node or the connection information to a node indicating the first group, as the content of the edit additionally performed.

According to the above configuration example, when it is desired to add a feature unique to the second group that the first group does not have but the second group has, information of the added feature is retained as the content of an additional edit on the first group. Accordingly, flexible editing work, such as making slight modifications to the second group with the first group as a base without directly modifying the first group itself, is enabled, thereby improving development efficiency.

(Configuration 5)

In Configuration 5 based on Configuration 1 or 2 above, the elements may be in-game objects, the first group may be a group including at least one node among at least one node associated with a first object, and the node and the connection information included in the second group may be associated with a second object.

According to the above configuration example, when another object is created with reference to a certain object, more efficient development work can be performed.

(Configuration 6)

In Configuration 6 based on any one of Configurations 1 to 5 above, the data editing program may cause the processor to display the node or the connection information on which the second edit has been performed, on the node editor in a display form different from that of a node or connection information on which the second edit has not been performed.

According to the above configuration example, when the second group is edited, it is easier to visually grasp the different portion (difference) from the first group.

(Configuration 7)

In Configuration 7 based on any one of Configurations 1 to 6 above, the data editing program may cause the processor to on the basis of an operation input to the node editor, create a third group obtained by copying the second group as a copy source and including a node and connection information of the node respectively corresponding to the node and the connection information of the node included in the second group, and retain the node or the connection information included in the third group as a content of an edit additionally performed on the node or the connection information included in the second group.

According to the above configuration example, a group is created as a copy destination with the second group as a copy source. In addition, the content of the edit performed on the third group can be retained as an edit further performed on the second group as the copy source.

According to the present disclosure, when setting elements using a node editor during game development, it is possible to provide a development environment in which editing is less time-consuming and development is easy.

BRIEF DESCRIPTION OF THE DRAWINGS

FIG. 4 shows a non-limiting example of an edit;

FIG. 5 shows a non-limiting example of an edit;

FIG. 7 shows a non-limiting example of an edit;

FIG. 8 shows a non-limiting example of an edit;

FIG. 11 shows a non-limiting example of an edit;

FIG. 12 shows a non-limiting example of an edit;

FIG. 13 illustrates generations of nodes;

FIG. 16 shows a non-limiting example of the data structure of detailed information 313 for a link-type node;

FIG. 17 shows a non-limiting example of the data structure of action data 315;

FIG. 18 shows a non-limiting example of the data structure of rendering process data 305;

FIG. 20 is a non-limiting example flowchart showing the details of the node editor processing;

FIG. 21 is a non-limiting example flowchart showing the details of the node editor processing; and FIG. 22 is a non-limiting example flowchart showing the details of a display process.

DETAILED DESCRIPTION OF NON-LIMITING EXAMPLE EMBODIMENTS

Figure 1:
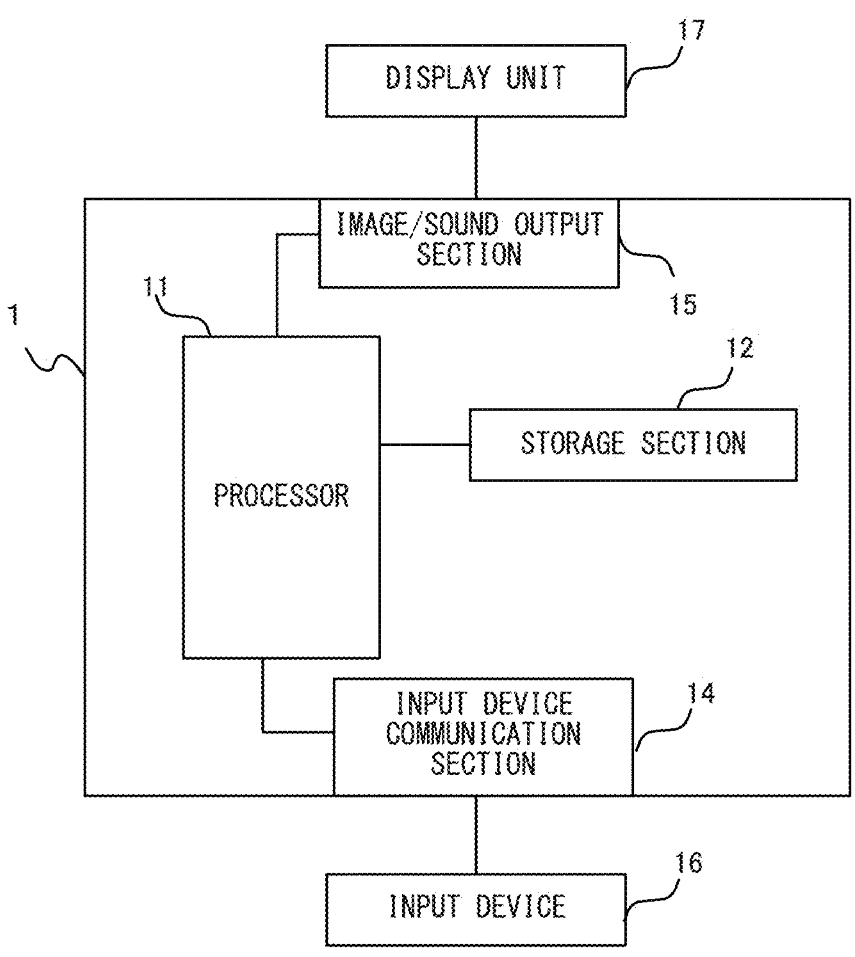
FIG. 1 is a block diagram showing the hardware configuration of an information processing apparatus 1.

Hereinafter, one exemplary embodiment of the present disclosure will be described. FIG. 1 is a block diagram showing the hardware configuration of an information processing apparatus 1 according to the exemplary embodiment. The information processing apparatus 1 is, for example, a personal computer (PC). The information processing apparatus 1 includes a processor 11. The processor 11 is an information processing section that executes various types of information processing performed in the information processing apparatus 1. The processor 11 executes various types of information processing by executing information processing programs (e.g., programs for various tools for game development) stored in a storage section 12. The storage section 12 may be, for example, an internal storage medium such as a flash memory and a dynamic random access memory (DRAM), or may be configured to utilize an external storage medium or the like.

The information processing apparatus 1 also includes an input device communication section 14 for performing wired or wireless communication with various input devices 16 such as a keyboard and a mouse. Moreover, the information processing apparatus 1 is connected to a display unit 17 (e.g., a PC monitor) via an image/sound output section 15. The processor 11 outputs images and sounds generated, for example, by executing the above information processing, to the display unit 17 via the image/sound output section 15.

Outline of Processing Assumed in Exemplary Embodiment

Next, an outline of processing assumed in the exemplary embodiment will be described. The exemplary embodiment relates to a node editor for use in game development sites and the like. The node editor provides a UI for performing setting for "game elements" included in a game. The game elements include, for example, character objects such as player characters and enemy characters, other various in-game objects that appear in the game, in-game events, game sequences (overall progress control), and shaders in CG.

Figure 2:
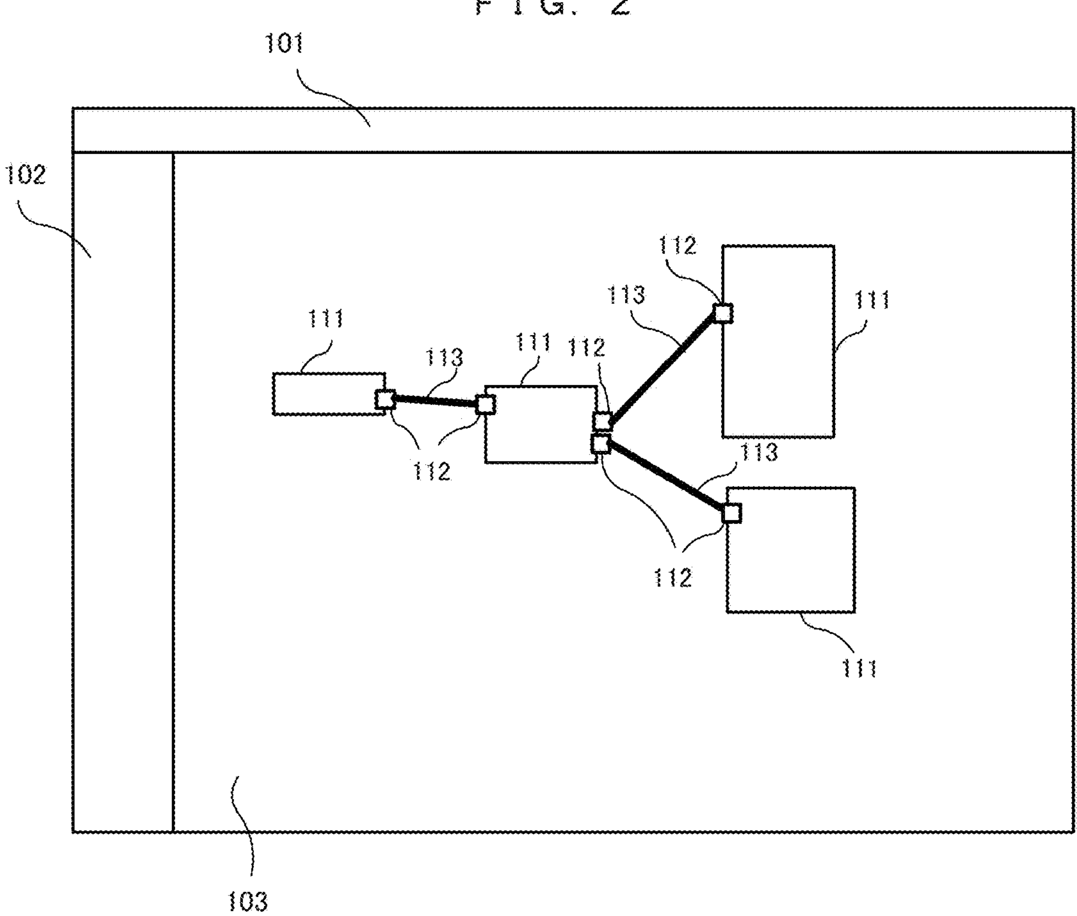
FIG. 2 shows a non-limiting example of a UI screen of a node editor.

FIG. 2 shows an example of a screen of the node editor. The screen example in FIG. 2 shows a first command-related area 101, a second command-related area 102, and an editing work area 103. In the first command-related area 101, for example, a menu bar and a tool bar are displayed. In the second command-related area 102, a plurality of game elements are listed and displayed, for example, in a tree format. The editing work area 103 is an area for visually presenting a node configuration and allowing a user to perform various types of editing work. In the example in FIG. 2, four nodes 111 are shown in the editing work area 103. The nodes are connected to each other by connection lines 113 in such a manner that the nodes are connected via plugs 112 contained in the respective nodes, showing the connection relationship between the nodes. In FIG. 2, each node 111 defines, for example, a function to be performed by a game element, various parameters and operation contents associated with the function, etc. Each plug 112 is a locational concept that connects the nodes 111 and can set, for example, the data input/output relationship between the nodes, the order of processes, etc. Each connection line 113 indicates the connection relationship between the nodes via the plugs 112. In other words, it can be said that the plugs 112 and the connection lines 113 are connection information of the nodes. Hereinafter, the nodes 111, the plugs 112, and the connection lines 113 are sometimes collectively referred to as "components". In addition, images of the nodes 111, the plugs 112, and the connection lines 113 displayed in the editing work area 103 are also sometimes collectively referred to as "node images". The user can use such a UI of the node editor to create (add) and delete nodes 111, plugs 112, and connection lines 113, and change the contents thereof (hereinafter, collectively referred to as "edit"). That is, the user can define the contents of various game elements by connecting nodes 111 having various functions. For example, the user can create actions of various objects, set up game sequences, and create shader processing contents. To give one example, when using the node editor to define the function of a "box-shaped object" which is one game element, a first node having a function of "always execute during the game" and a second node having a function of "rotate" can be created and connected, thereby defining a game element that is a box-shaped object that always rotates during game processing.

With the node editor according to the exemplary embodiment, a combination of the nodes, the plugs, and the connection lines described above can be grouped into a single new node. Hereinafter, for convenience of description, a grouped node is referred to as "group node".

With the node editor according to the exemplary embodiment, a new node can be created so as to be linked with a certain node as a "reference source". That is, a new node can be created by copying the entire content of the node serving as the "reference source". For example, by performing a so-called "copy and paste" operation, a new node can be created so as to be linked with a copy source. Hereinafter, such a linked node is referred to as "link-type node". In addition, a node (link source node) serving as the "reference source" for the link-type node is referred to as "reference node". The node that can be treated as a "reference source" is the above group node. In the exemplary embodiment, nodes, plugs, and connection lines that are not grouped cannot be directly designated as "reference sources". However, in another exemplary embodiment, nodes that are not grouped may also be designated as "reference sources".

In the exemplary embodiment, in principle, the content of an edit performed on the reference node is reflected in the link-type node, but the content of an edit performed on the link-type node is not reflected in the reference node. In addition, control is also performed such that, in a portion on which an edit is performed uniquely in the link-type node (portion on which a local edit described later is performed), an edit performed on the reference node later is not reflected. Hereinafter, examples of operations related to the link-type node in the exemplary embodiment will be described using screen examples.

First, creation of a link-type node will be described. Here, first, it is assumed that the node configuration as shown in FIG. 2 above is created on the basis of user operations. After such a node configuration is created, the user performs an operation for grouping the node configuration. For example, such an operation is an operation of selecting a "grouping" command in a state where nodes, plugs, and connection lines desired to be grouped are selected. Accordingly, a group node is created.

Figure 3:
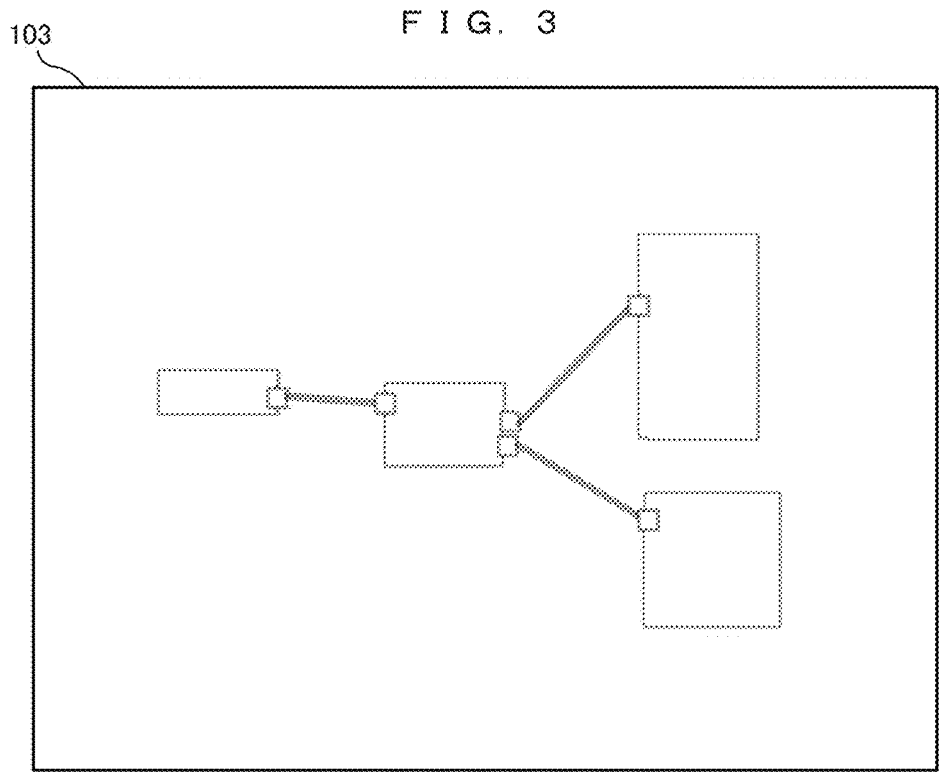
FIG. 3 shows a non-limiting example of a link-type node.

Next, the user designates the above group node as a "reference source" and performs a "link-type node creation operation", thereby creating a link-type node. FIG. 3 shows an example of a node image of the link-type node created with the group node as shown in FIG. 2 above as a reference node. In FIG. 3, the node configuration is exactly the same as that of the reference node in FIG. 2 above. However, the link-type node is displayed on the screen in a display form different from that of the reference node. In the exemplary embodiment, for example, the link-type node is displayed semi-transparently. On the actual node editor screen, separate group nodes that are not directly connected to each other can be displayed in parallel. For example, two node images of a reference node and a link-type node can be displayed together in the editing work area 103.

Next, it is assumed that the reference node is edited after the above link-type node is created. For example, it is assumed that the node configuration in FIG. 2 is edited as shown in FIG. 4. FIG. 4 is an example in which a new node is added to the reference node. In this case, as shown in FIG. 5, the addition of the new node is also reflected in the configuration of the link-type node. The timing when the content of the edit on the reference node is reflected is, for example, the timing when the user operates a button for "update of display contents", the time when a file related to the link-type node is opened, etc. In addition, as soon as the content of the edit on the reference node is confirmed, the content of the edit may be immediately reflected in the display of the link-type node.

Figure 6:
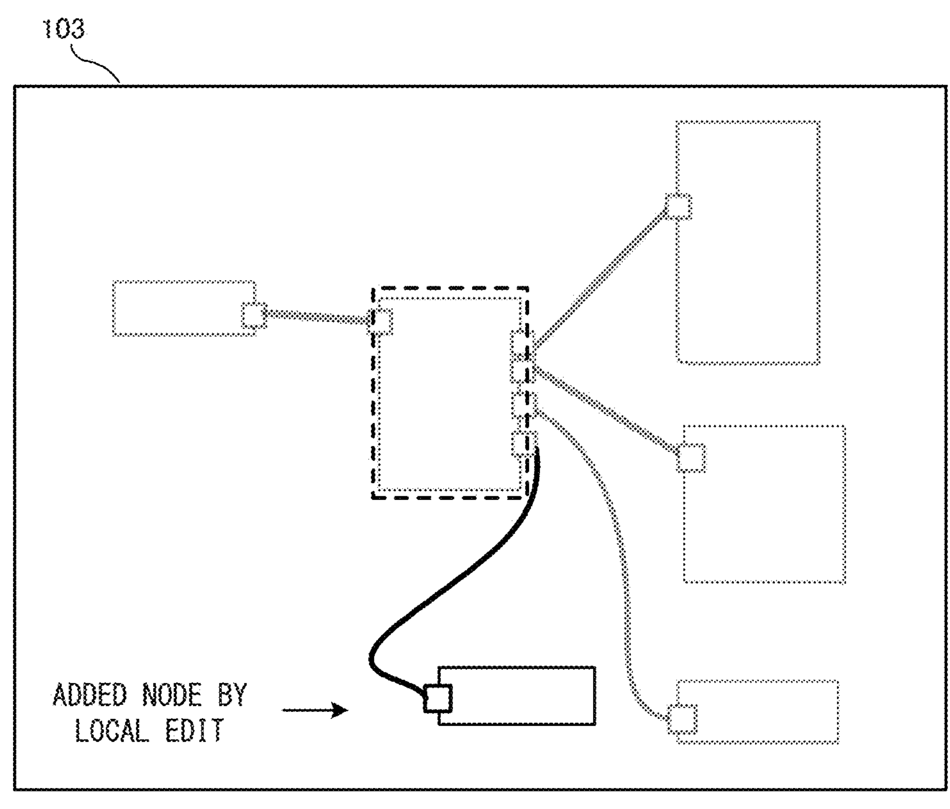
FIG. 6 shows a non-limiting example of an edit.

Next, it is assumed that the link-type node is edited after the above link-type node is created. For example, it is assumed that the node configuration in FIG. 5 is changed to a content shown in FIG. 6. FIG. 6 is an example in which one new node is added to the link-type node. In this case, the content of the edit (hereinafter, referred to as "local edit") performed on the link-type node is not reflected in the reference node. Therefore, when the content of the reference node in this case is displayed, the content of the reference node is the same as in FIG. 4 above. That is, the local edit performed on the link-type node is applied only to the link-type node. Therefore, the link-type node can be caused to have a feature that the reference node does not have. For example, it is assumed that, with a "character A" as a base, it is desired to create and edit another character such as a "character A1" or a "character A2" having a slightly different appearance, action contents, etc. In this case, a link-type node related to each character can be created with a group node related to the character A as a reference node, and can be edited, thereby enabling efficient editing work.

Here, in the exemplary embodiment, information indicating the content of a local edit performed on the above link-type node is stored as "action information". Then, when displaying the link-type node on the node editor, the link-type node is constructed and displayed by taking the content of the reference node and applying the action information thereto (overwriting the taken content of the reference node with the content of the local edit). Therefore, the content of the node on which the local edit has been performed in the link-type node is overwritten with the content of the above action information even if the same node is further edited in the reference node later. That is, as a result, an edit performed on the reference node later is not reflected. For example, it is assumed that a local edit such as changing a parameter for a certain node taken from the reference node or adding a parameter to the certain node is performed instead of adding a new node as described above. As a specific example, it is assumed that, as shown in FIG. 7, a local edit of changing the value of a first parameter included in a node C from "A" to "B" is performed on a link-type node. In this case, for example, action information having a content of changing the first parameter of the node "C" to "B" is stored. Then, it is assumed that, as shown in FIG. 8, the value of the first parameter of the same node C is changed from "A" to "C" in the reference node. In this case, when the link-type node is reopened, the reference node in which the value of the first parameter is "C" is taken once. Then, the above action information is applied, and the value of the first parameter of the above node C in the link-type node is overwritten from "C" to "B". Therefore, as a result, the change content in the reference node corresponding to the portion on which the local edit has been performed is not reflected in the link-type node (the content of the local edit is prioritized). On the other hand, in a portion on which no local edit is performed in the link-type node, the content of an edit on the reference node is reflected as described above.

Since the content of the local edit on the link-type node is stored as action information as described above, when a certain node is deleted from the link-type node, information indicating this deletion is stored as action information. Therefore, even if the deleted node remains in the reference node, when the link-type node is displayed, the link-type node is displayed in a state where the node is deleted, on the basis of the action information. That is, the content of the local edit that the node is deleted is reflected.

In addition, on the UI of the node editor, a portion on which a local edit is performed is displayed in a different display form such that this portion can be distinguished from the configuration of the reference node. In this example, the link-type node is displayed semi-transparently as described above. For example, if there is a "change" in any node (node displayed semi-transparently), the changed node is displayed so as to be surrounded by a dotted frame as shown in FIG. 6 or FIG. 7 above. In the example in FIG. 6, a change of "adding a plug" is made to the node. Accordingly, it is possible to clearly present that this node is a node that has been changed in the reference node. When a node that does not exist in the reference node is "added", the added node (and a plug and a connection line associated therewith) is displayed such that the added node is not made semi-transparent and is not surrounded by a dotted frame as shown in FIG. 6 above. Accordingly, it is possible to clearly present that this node is a node that does not exist in the reference node.

Figure 9:
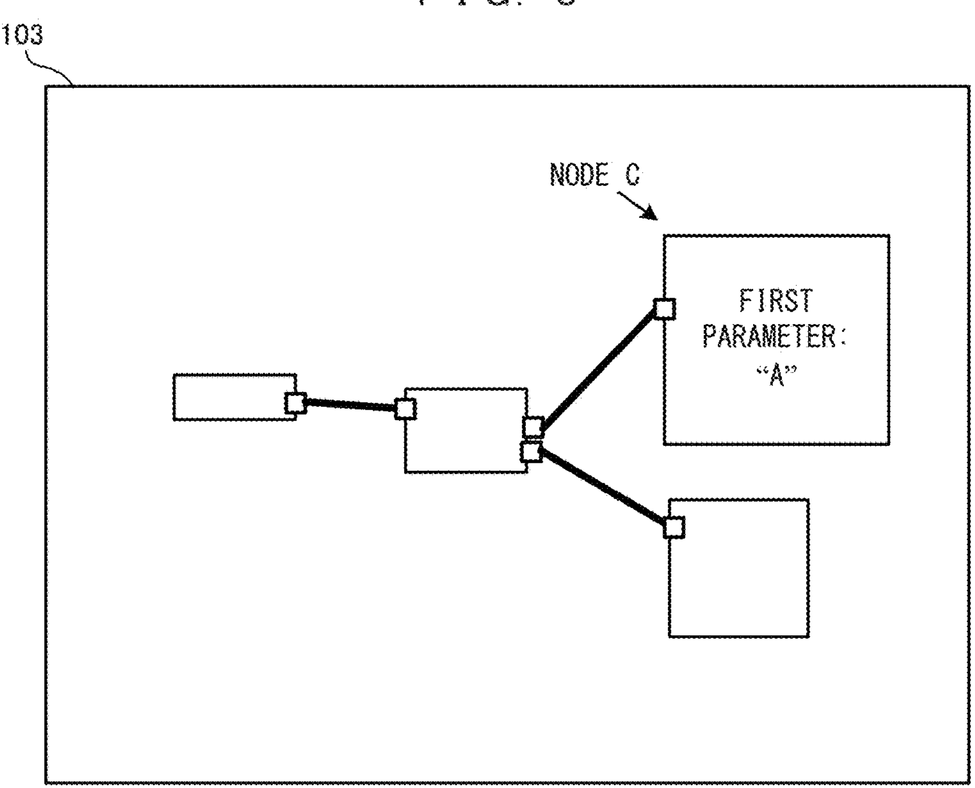
FIG. 9 shows a non-limiting example of an edit.
Figure 10:
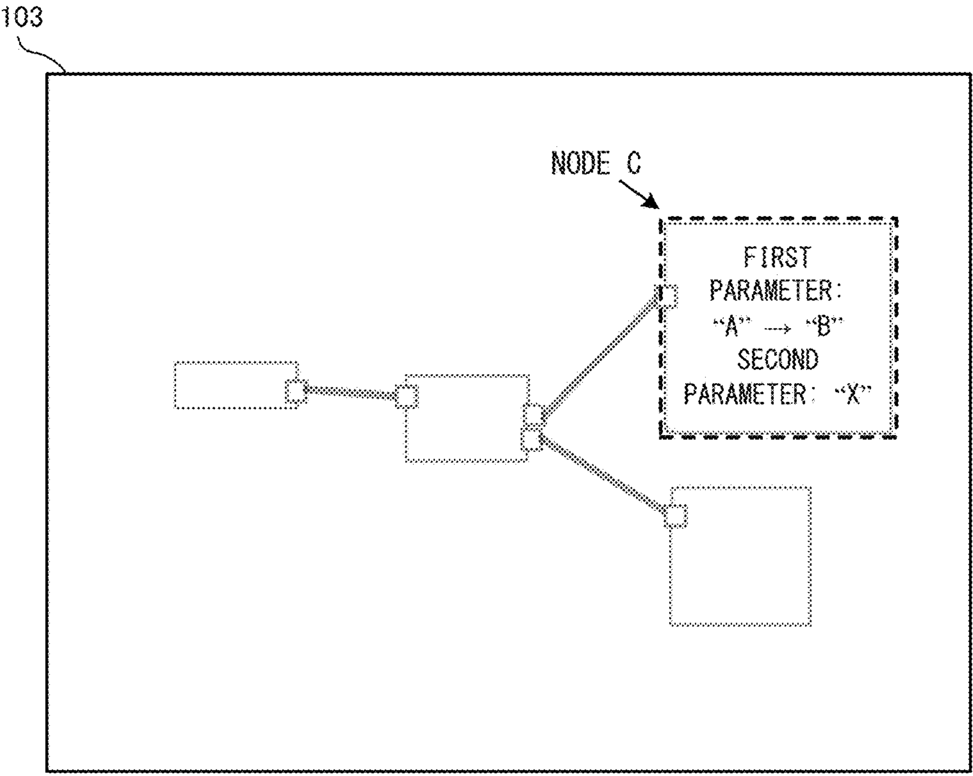
FIG. 10 shows a non-limiting example of an edit.

Regarding the above action information, it is assumed that, after a local edit occurs in the link-type node, the node on which the local edit has been performed is deleted in the reference node. For example, it is assumed that the reference node is configured as shown in FIG. 9 and the link-type node is configured as shown in FIG. 10. In FIG. 9, the node C includes only a first parameter. FIG. 10 shows that in the node C, the value of the first parameter is changed and a second parameter is further added. It is assumed that, from this state, an edit of deleting the node C is performed on the reference node as shown in FIG. 11. In this case, as a result, the node C is also deleted in the link-type node as shown in FIG. 12. That is, edit information for the node C is stored in the action information of the link-type node, but the node C which is the edit target is deleted from the reference node, so that the content of the edit cannot also be applied.

Meanwhile, in the exemplary embodiment, a new link-type node can be created with the above link-type node as a reference node. For example, FIG. 13 shows three node configurations. In FIG. 13, a first generation node, a second generation node, and a third generation node are shown in this order from the top. The first generation node is a reference node in relation to the second generation node. The second generation node is a link-type node created with the first generation node as a reference node. In addition, the third generation node is a link-type node created with the second generation node as a reference node. Therefore, the second generation node corresponds to a link-type node in relation to the first generation node, and corresponds to a reference node in relation to the third generation node. In addition, the node configuration of the second generation node is a configuration in which the configuration of the first generation node is incorporated and the content of a local edit on the second generation node is added. FIG. 13 shows an example in which a node that does not exist in the first generation node is added in the second generation node. In addition, the node configuration of the third generation node is a configuration in which the configuration of the second generation node is incorporated and the content of a local edit on the third generation node is added. FIG. 13 shows an example in which a node that does not exist in the second generation node is further added. Even if a link-type node is created such that the generation thereof is increased as described above, control is performed such that, as in the above, the content of an edit on the reference node is reflected in the link-type node except for a node on which a local edit is performed, etc., and the content of an edit on the link-type node is not reflected in the reference node. Therefore, in FIG. 13, when a certain node in the first generation node is edited, the content of the edit is reflected in the third generation node if no local edit is performed on this node. The content of an edit on the second generation node is not reflected in the first generation node, but is reflected in the third generation node. The content of an edit on the third generation node is applied to only the third generation node. If a later generation of link-type node is further created with the third generation node as a reference node, the content of an edit on the third generation node is reflected in subsequent generations.

Details of Processing of Exemplary Embodiment

Next, the processing in the exemplary embodiment will be described in more detail with reference to FIG. 14 to FIG. 22.

[Data to be Used]

First, an example of various types of data used in the exemplary embodiment will be described. The data structures described below are examples, and any data structures may be adopted as long as node control can be performed as described above.

Figures 14, 15:
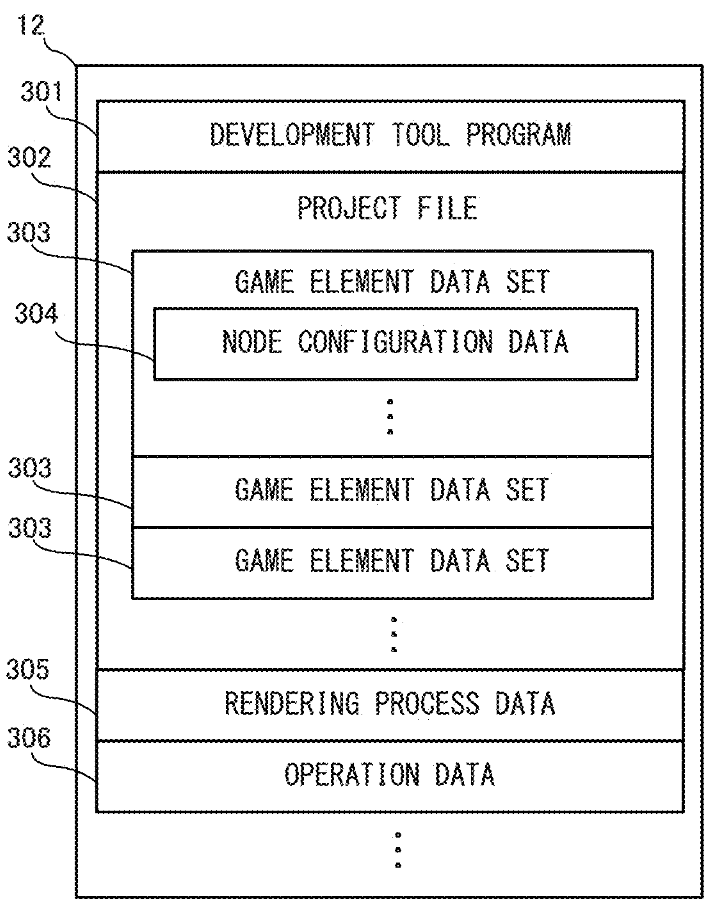
FIG. 14 illustrates a memory map showing a non-limiting example of various types of data stored in a storage section 12 of the information processing apparatus 1.
FIG. 15 shows a non-limiting example of the data structure of node configuration data 304.

FIG. 14 illustrates a memory map showing an example of various types of data stored in the storage section 12 of the information processing apparatus 1. In the storage section 12, a development tool program 301, a project file 302, rendering process data 305, operation data 306, etc., are stored.

The development tool program 301 is a development tool program including processing of the node editor described above in the information processing apparatus 1.

The project file 302 is a file including a plurality of game element data sets 303. The project file 302 is, for example, a file corresponding to a predetermined game title. The game element data sets 303 are data sets respectively corresponding to the game elements as described above such as various objects that appear in the game. Each game element data set 303 includes node configuration data 304. The node configuration data 304 has a content that defines the function of the game element using the above nodes, and is data corresponding to the node configuration shown in FIG. 2 and the like above. That is, the node configuration data 304 is data recording information on the above nodes, plugs, and connection lines for the game element.

FIG. 15 shows an example of the data structure of the above node configuration data 304. The node configuration data 304 is data in a table format consisting of a set of records each including items such as a component ID 311, a configuration type 312, and detailed information 313. The component ID 311 is an ID for uniquely identifying each of the above nodes, plugs, and connection lines. The configuration type 312 is information indicating the type of the component identified by the component ID 311. Specifically, the configuration type 312 is information indicating one of ungrouped nodes, plugs, connection lines, group nodes, and link-type nodes. The detailed information 313 is information for indicating the content of the component. Specifically, in the case of an ungrouped node, the detailed information 313 includes information indicating the functionality (e.g., functions, etc.), various parameters, etc., of the node. In the case where the component is a plug, the detailed information 313 includes, for example, the component ID 311 of the node to which the plug belongs, and information indicating the property of the plug such as whether the plug indicates an input or an output. In the case where the component is a connection line, the detailed information 313 includes the component ID 311 of the plug (or node) connected by the connection line. In the case where the component is a group node, the detailed information 313 includes the component IDs 311 for identifying the nodes, the plugs, and the connection lines included in the group node.

In the case where the component is a link-type node, information shown in FIG. 16 is stored in the detailed information 313. FIG. 16 shows that the detailed information 313 includes reference node information 314 and action data 315. The reference node information 314 is information (component ID 311) identifying the node (in this example, one group node) to which the link-type node refers. The action data 315 is data of action information as described above. FIG. 17 shows an example of the structure of the action data 315. The action data 315 is data in a table format consisting of a set of records each including items such as an action number 316, an action type 317, an action target ID 318, and action detailed information 319.

The action number 316 is a number for identifying each action in the action information, and, in this example, such a number is stored in the order in which the above local edit is confirmed. If multiple local edits have been performed on the same component, only the content of the most recent edit is stored.

The action type 317 is information for identifying whether the content of the local edit is “change”, “addition”, or “deletion”. In the case where the content of the local edit is “change”, the action target ID 318 indicates the component ID 311 for which the local edit is performed. In the case of “addition”, the action target ID 318 indicates a component ID 311 assigned when the component is added. In the case of “deletion”, the action target ID 318 indicates the component ID 311 of a component to be deleted.

In the case where the action type 317 is “change”, the action detailed information 319 is information indicating the specific content of the local edit. For example, the action detailed information 319 includes information indicating the content of a changed parameter or the like. In the case where the action type 317 is “addition”, information based on the component ID 311 of an added component is acquired from the node configuration data 304. In the case of “deletion”, the target to be deleted is indicated by the action target ID 318. Therefore, in these cases, for example, a Null value is set in the action detailed information 319.

Referring back to FIG. 15, in addition to the above data, the node configuration data 304 also includes information indicating the display position of each component on the UI screen of the node editor, etc., although this information is not shown.

Referring back to FIG. 14, the rendering process data 305 is temporary working data used when displaying node images on the UI screen of the node editor. For example, when displaying a link-type node, information indicating a specific node configuration for screen display is generated as the rendering process data 305 on the basis of the information and the action information of the reference node. For example, it is assumed that, when displaying a link-type node, there is a node that is not deleted in the reference node but is deleted by a local edit. In this case, information of this node is not deleted from the node configuration data 304, but information of a node configuration in which this node is deleted in the rendering process data 305 is created. On the basis of this, a node image for screen display is generated for the link-type node.

FIG. 18 shows an example of the data structure of the rendering process data 305. A rendering element ID 321 indicates the component ID 311 of a component to be rendered. A rendering type 322 indicates information indicating the type of the component. Rendering element detailed information 323 is based on the detailed information 313, and is information indicating the specific content of the component. As described above, in the case of a link-type node, a node image is generated on the basis of the information and the action information of the reference node. For example, FIG. 18 above shows six rendering elements, of which the first three can have a content taken from the information of the reference node and a content reflecting a local edit of “change” based on action information, and the latter three can have a content reflecting a local edit of “addition” based on action information.

The data shown in FIG. 18 above may be created for each game element. For example, when node configurations of multiple game elements are displayed in parallel on the UI, the rendering process data 305 shown in FIG. 18 is prepared so as to be associated with each game element. In other words, rendering process data 305, the number of which is equal to the number of game elements that are simultaneously open on the node editor, may be generated.

Referring back to FIG. 14, the operation data 306 is data indicating the contents of operations performed on the input devices 16 by the user.

Next, an example of the processing in the exemplary embodiment will be described. In the exemplary embodiment, processing in flowcharts described below is realized by one or more processors reading and executing programs stored in one or more memories. The flowcharts are merely an example of the processing. Therefore, the order of each process step may be changed as long as the same result is obtained. In addition, the values of variables and thresholds used in determination steps are also merely examples, and other values may be used as necessary.

Figure 19:
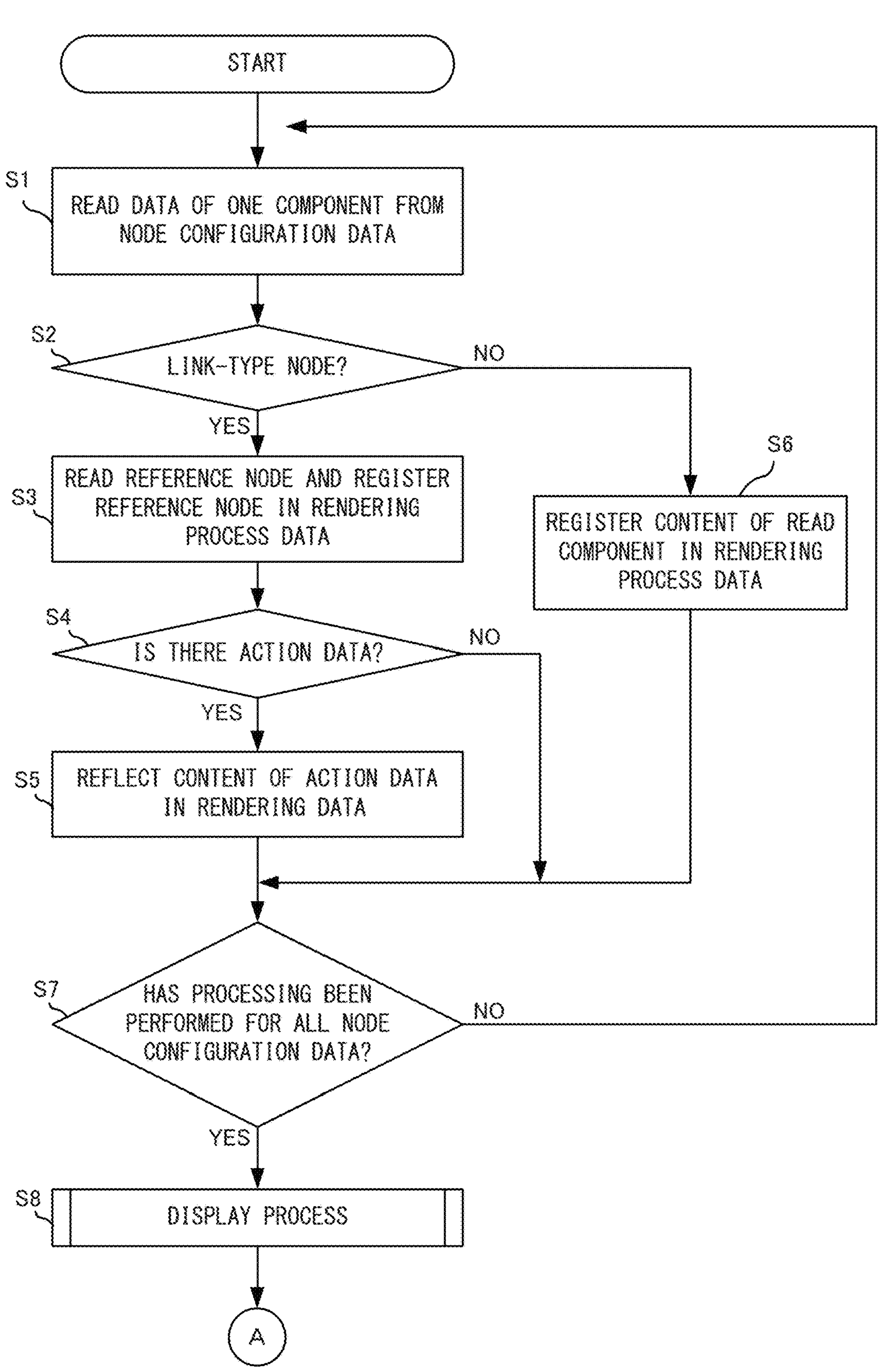
FIG. 19 is a non-limiting example flowchart showing the details of node editor processing.

FIG. 19 to FIG. 21 are flowcharts showing an example of the node editor processing in the exemplary embodiment. This processing is started, for example, by performing an operation for activating the “node editor” from a menu or the like in a state where a predetermined game element is selected on the UI screen of a development tool.

In FIG. 19, first, in step S1, the processor 11 reads the data of one component from the node configuration data 304 of the designated game element. In this example, it is possible to read data for a plurality of game elements and display the node configurations of the respective game elements in parallel on the UI screen.

Next, in step S2, the processor 11 determines whether or not the read data of the component is the data of a link-type node. As a result of the determination, when the component is not a link-type node (NO in step S2), in step S6, the processor 11 registers the content of the read data of the component in the rendering process data 305. Then, the processor 11 advances the processing to step S7 described later.

On the other hand, as a result of the determination in step S2 above, when the component is a link-type node (YES in step S2), in step S3, the processor 11 searches for the reference node indicated by the reference node information 314 included in the detailed information 313, and reads the data of the reference node. In this example, since the reference node is one group node, the data of the multiple components included in the group node is read. Then, the processor 11 registers the read information of the reference node in the rendering process data 305. Accordingly, the node configuration indicated in the reference node is developed in the rendering process data 305.

Next, in step S4, the processor 11 determines whether or not there is valid action data 315 in the detailed information 313 of the link-type node. In this example, if the action data 315 is not empty data, the action data 315 is treated as valid action data. As a result of the determination, when there is valid action data 315 (YES in step S4), in step S5, the processor 11 reflects the content of the action data 315 in the rendering process data 305. That is, the processor 11 performs a process of overwriting the content of the reference node with the content of the above local edit. For example, if there is a node that has been "changed", the information of this node in the rendering process data 305 is rewritten on the basis of the content of the action data 315. If there is a node or the like that has been "added", the information of the added node or the like is added to the rendering process data 305. If there is a node or the like that has been "deleted", the data of the corresponding node or the like is deleted from the rendering process data 305. On the other hand, as a result of the determination in step S4 above, when there is no valid action data 315 (NO in step S4), the process in step S5 above is skipped.

Next, in step S7, the processor 11 determines whether or not the above processing has been performed for all the components included in the node configuration data 304 that is the reading target. As a result of the determination, when any component on which the processing has not been performed yet remains (NO in step S7), the processor 11 returns to step S1 above and repeats the processing.

On the other hand, when the processing has been performed for all the components (YES in step S7), in step S8, the processor 11 performs a display process. FIG. 22 is a flowchart showing the details of the display process. In FIG. 22, first, in step S31, the processor 11 generates a node image visually showing the node configuration as shown in FIG. 2 and the like above, on the basis of the rendering process data 305. Next, in step S32, when the rendering process data 305 includes a link-type node, the processor 11 performs setting for displaying a node image of the link-type node semi-transparently. At this time, an "added" node that does not exist in the reference node is not set to be displayed semi-transparently, but is set to be displayed in an opaque state. Next, in step S33, when there is a portion on which a local edit has been performed in the link-type node (there is action data 315), the processor 11 further performs setting for displaying the portion on which the local edit has been performed, such that the display form thereof is changed. That is, a node in which any "change" has occurred in the configuration of the reference node is set to be displayed using a dotted frame. Next, in step S34, the processor 11 generates and displays a UI image reflecting the above display settings. This is the end of the display process.

Next, in step S9 in FIG. 20, the processor 11 determines whether or not an operation for creating a group node has been performed. As a result of the determination, when the operation has been performed (YES in step S9), in step S10, the processor 11 sets information indicating each component designated for grouping, as the detailed information 313, and generates data in which a "group node" is set as the configuration type 312. Then, the processor 11 adds the data to the node configuration data 304. Then, the processor 11 advances the processing to step S21 described later.

On the other hand, as a result of the determination in step S9 above, when the operation for creating a group node has not been performed (NO in step S9), next, in step S11, the processor 11 determines whether or not an operation for creating a link-type node has been performed. When the operation for creating a link-type node has been performed (YES in step S11), in step S12, the processor 11 sets reference node information 314 and action data 315 having an empty content, in the detailed information 313 on the basis of the content of the operation. Furthermore, the processor 11 adds data in which a "link-type node" is set as the configuration type 312, to the node configuration data 304. Then, the processor 11 advances the processing to step S21 described later. As an example of creating a link-type node, it is assumed that a second object is created with a first object that is one game element as a base. In this case, first, the user performs an operation for creating the second object. Accordingly, a game element data set 303 itself is newly generated for the second object (at this stage, data having an empty content or data set to default is set). In addition, an area corresponding to the second object, such as a window corresponding to the second object, is displayed. Then, for example, an operation of copying and pasting a group node in the first object into the window corresponding to the second object, is performed. This operation corresponds to an operation for creating a link-type node with the group node in the first object designated as a reference node. Accordingly, detailed information 313 in which the component ID 311 of the group node in the first object is set as the reference node information 314 is generated. Then, the data of the link-type node including the detailed information 313 is added to the node configuration data 304. In addition, the node configuration data 304 is included in the game element data set 303 for the second object.

When creating the second object with the first object as a base as described above, the second object may be created with the entire node configuration of the first object as a reference node, or the second object may be created with only a part of the node configuration of the first object as a reference node.

On the other hand, as a result of the determination in step S11 above, when the operation for creating a link-type node has not been performed (NO in step S11), in step S13, the processor 11 determines whether or not an edit operation has been performed on the node configuration of a predetermined game element, on the basis of the operation data 306 (here, the content of the edit has not been confirmed yet and it is still in the middle of the edit). The edit operation is any of an operation for creating (adding) a new component, an operation for changing the content of an existing component (e.g., changing a parameter included in a node or adding a parameter), and an operation for deleting an existing component. As a result of the determination, when the edit operation has been performed (YES in step S13), in step S14, the processor 11 updates the rendering process data 305 such that the content of the edit operation is reflected therein. That is, a process for reflecting the content of the edit operation in the screen display in real time is performed. Then, the processor 11 advances the processing to step S21 described later.

On the other hand, as a result of the determination in step S13 above, when the edit operation has not been performed (NO in step S13), in step S15, the processor 11 determines whether or not an operation for confirming the content of the edit for the predetermined game element has been performed. This operation is, for example, an operation for completing the input during the edit or an operation for instructing to "save data". When the operation for confirming the content of the edit has been performed (YES in step S15), next, in step S16, the processor 11 determines whether or not the target for which the edit has been confirmed is a link-type node. As a result of the determination, when the target is not a link-type node (NO in step S16), in step S17, the processor 11 updates the content of the node configuration data 304 on the basis of the content of the edit (the content of the rendering process data 305 at this time). For example, when a node is added, a new component ID 311 is assigned, and the content thereof is registered. When the content of a certain node is changed, the content of the corresponding detailed information 313 is updated according to the changed content. When a certain node is deleted, the information of that node is deleted from the node configuration data 304.

On the other hand, when the operation for confirming the edit for a link-type node has been performed (YES in step S16), the edit corresponds to a local edit. In this case, in step S18, the processor 11 adds information indicating the content of the local edit, to the action data 315 on the basis of the rendering process data 305. Then, the processor 11 advances the processing to step S21 described later.

On the other hand, as a result of the determination in step S15 above, when the operation for confirming the edit has not been performed (NO in step S15), next, in step S19 in FIG. 21, the processor 11 determines whether or not an operation for ending the node editor has been performed. When the operation for ending the node editor has been performed (YES in step S19), the processor 11 ends the node editor processing. On the other hand, when the operation for ending the node editor has not been performed (NO in step S19), in step S20, the processor 11 executes various processes other than the above based on the operation contents indicated by the operation data 306. For example, when an operation for reading data for another game element has been performed, the processor 11 reads the data for the designated game element through the same processes as in steps S1 to S7 above. Then, the processor 11 creates rendering process data 305 on the basis of the read content.

Next, in step S21, the processor 11 determines whether or not the display of the reference node needs to be updated for the currently displayed node configuration. For example, when a "display update button" provided in the tool bar of the UI has been pressed, or when saving for the reference node has been performed in the above processing, or when a certain file has been read, it is determined that the display content of the reference node needs to be updated. As a result of the determination, when the display content needs to be updated (YES in step S21), in step S22, the processor 11 re-reads the data of the reference node to be displayed in the UI, and reflects the content of the data in the rendering process data 305. On the other hand, when the display content does not need to be updated (NO in step S21), the process in step S22 above is skipped.

Next, in step S23, the processor 11 performs a display process. This process is the same process as in step S8 above, and thus the detailed description is omitted, but the UI screen is displayed on the basis of the rendering process data 305 in which the above various edit contents, etc., are reflected. Then, the processor 11 returns to step S9 above, and repeats the processing.

This is the end of the detailed description of the node editor processing according to the exemplary embodiment.

As described above, in the exemplary embodiment, many types of game elements having common features can be adjusted all at once by reflecting the content of an edit for a reference node also in a link-type node. Furthermore, when a link-type node is caused to have a feature independent of a reference node by editing a part of the link-type node, this feature can be caused to remain regardless of the content of an edit subsequently performed on the reference node. Therefore, edits can be performed efficiently for a large number of game elements, so that it is possible to provide a development environment in which editing is less time-consuming and development is easy.

Modifications

In the above embodiment, the node editor for use in game development has been described as an example. The above link-type node control can also be applied to the case when the node editor is used in aspects other than game development. For example, the above processing may be applied to a node editor that uses document files such as business documents instead of the above game elements.

In the above embodiment, the case where the series of processes related to the node editor are performed in a single information processing apparatus has been described in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of processes may be performed by the server side apparatus, and a part of the series of processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a player's operation to a predetermined server, and the server may be configured to execute various kinds of game processing and stream the execution results as video/audio to the game apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A non-transitory computer-readable storage medium having stored therein a data editing program causing a processor of an information processing apparatus to:

present a UI of a node editor for performing setting for elements included in a game under development; and on the basis of an operation input to the node editor, create a first group including at least one node, create a second group obtained by copying the first group as a copy source and including a node and connection information respectively corresponding to the node and the connection information of the node included in the first group, when a first edit is performed on the node or the connection information included in the first group, further reflect the first edit in the corresponding node or connection information included in the second group at a predetermined timing, and when a second edit is performed on the node or the connection information included in the second group, further change the edited node or connection information to a state where the first edit is not reflected thereafter.

2. The storage medium according to claim 1, wherein the data editing program causes the processor to retain the node or the connection information included in the second group, as a content of an edit additionally performed on the node or the connection information included in the first group.

3. The storage medium according to claim 2, wherein the data editing program causes the processor to, when an edit of deleting the node or the connection information included in the second group is performed on the basis of an operation input to the node editor, retain the deletion of the node or the connection information included in the second group, as the content of the edit additionally performed.

4. The storage medium according to claim 2, wherein the node includes a group, and the data editing program causes the processor to when an edit of adding a new node or connection information to the second group is performed on the basis of an operation input to the node editor, retain addition of the node or the connection information to a node indicating the first group, as the content of the edit additionally performed.

5. The storage medium according to claim 1, wherein the elements are in-game objects, the first group is a group including at least one node among at least one node associated with a first object, and the node and the connection information included in the second group are associated with a second object.

6. The storage medium according to claim 5, wherein the data editing program causes the processor to display the node or the connection information on which the second edit has been performed, on the node editor in a display form different from that of a node or connection information on which the second edit has not been performed.

7. The storage medium according to claim 5, wherein the data editing program causes the processor to on the basis of an operation input to the node editor, create a third group obtained by copying the second group as a copy source and including a node and connection information of the node respectively corresponding to the node and the connection information of the node included in the second group, and retain the node or the connection information included in the third group as a content of an edit additionally performed on the node or the connection information included in the second group.

8. A data editing system comprising at least one processor, the processor being configured to:

present a UI of a node editor for performing setting for elements included in a game under development; and on the basis of an operation input to the node editor, create a first group including at least one node, create a second group obtained by copying the first group as a copy source and including a node and connection information respectively corresponding to the node and the connection information of the node included in the first group, when a first edit is performed on the node or the connection information included in the first group, further reflect the first edit in the corresponding node or connection information included in the second group at a predetermined timing, and when a second edit is performed on the node or the connection information included in the second group, further change the edited node or connection information to a state where the first edit is not reflected thereafter.

9. The data editing system according to claim 8, wherein the processor is configured to retain the node or the connection information included in the second group, as a content of an edit additionally performed on the node or the connection information included in the first group.

10. The data editing system according to claim 9, wherein the processor is configured to, when an edit of deleting the node or the connection information included in the second group is performed on the basis of an operation input to the node editor, retain the deletion of the node or the connection information included in the second group, as the content of the edit additionally performed.

11. The data editing system according to claim 9, wherein the node includes a group, and the processor is configured to when an edit of adding a new node or connection information to the second group is performed on the basis of an operation input to the node editor, retain addition of the node or the connection information to a node indicating the first group, as the content of the edit additionally performed.

12. The data editing system according to claim 8, wherein the elements are in-game objects, the first group is a group including at least one node among at least one node associated with a first object, and the node and the connection information included in the second group are associated with a second object.

13. The data editing system according to claim 12, wherein the processor is configured to display the node or the connection information on which the second edit has been performed, on the node editor in a display form different from that of a node or connection information on which the second edit has not been performed.

14. The data editing system according to claim 8, wherein the processor is configured to on the basis of an operation input to the node editor, create a third group obtained by copying the second group as a copy source and including a node and connection information of the node respectively corresponding to the node and the connection information of the node included in the second group, and retain the node or the connection information included in the third group as a content of an edit additionally performed on the node or the connection information included in the second group.

15. A data editing method causing a processor of an information processing apparatus to:

present a UI of a node editor for performing setting for elements included in a game under development; and on the basis of an operation input to the node editor, create a first group including at least one node, create a second group obtained by copying the first group as a copy source and including a node and connection information respectively corresponding to the node and the connection information of the node included in the first group, when a first edit is performed on the node or the connection information included in the first group, further reflect the first edit in the corresponding node or connection information included in the second group at a predetermined timing, and when a second edit is performed on the node or the connection information included in the second group, further change the edited node or connection information to a state where the first edit is not reflected thereafter.

16. The data editing method according to claim 15, causing the processor to retain the node or the connection information included in the second group, as a content of an edit additionally performed on the node or the connection information included in the first group.

17. The data editing method according to claim 16, causing the processor to, when an edit of deleting the node or the connection information included in the second group is performed on the basis of an operation input to the node editor, retain the deletion of the node or the connection information included in the second group, as the content of the edit additionally performed.

18. The data editing method according to claim 16, wherein the node includes a group, and the data editing method causes the processor to when an edit of adding a new node or connection information to the second group is performed on the basis of an operation input to the node editor, retain addition of the node or the connection information to a node indicating the first group, as the content of the edit additionally performed.

19. The data editing method according to claim 15, wherein the elements are in-game objects, the first group is a group including at least one node among at least one node associated with a first object, and the node and the connection information included in the second group are associated with a second object.

20. The data editing method according to claim 19, causing the processor to display the node or the connection information on which the second edit has been performed, on the node editor in a display form different from that of a node or connection information on which the second edit has not been performed.

21. The data editing method according to claim 19, causing the processor to on the basis of an operation input to the node editor, create a third group obtained by copying the second group as a copy source and including a node and connection information of the node respectively corresponding to the node and the connection information of the node included in the second group, and retain the node or the connection information included in the third group as a content of an edit additionally performed on the node or the connection information included in the second group.

22. A data editing apparatus comprising at least one processor, the processor being configured to:

present a UI of a node editor for performing setting for elements included in a game under development; and on the basis of an operation input to the node editor, create a first group including at least one node, create a second group obtained by copying the first group as a copy source and including a node and connection information respectively corresponding to the node and the connection information of the node included in the first group, when a first edit is performed on the node or the connection information included in the first group, further reflect the first edit in the corresponding node or connection information included in the second group at a predetermined timing, and when a second edit is performed on the node or the connection information included in the second group, further change the edited node or connection information to a state where the first edit is not reflected thereafter.

23. The data editing apparatus according to claim 22, wherein the processor is configured to retain the node or the connection information included in the second group, as a content of an edit additionally performed on the node or the connection information included in the first group.

24. The data editing apparatus according to claim 23, wherein the processor is configured to, when an edit of deleting the node or the connection information included in the second group is performed on the basis of an operation input to the node editor, retain the deletion of the node or the connection information included in the second group, as the content of the edit additionally performed.

25. The data editing apparatus according to claim 23, wherein the node includes a group, and the processor is configured to when an edit of adding a new node or connection information to the second group is performed on the basis of an operation input to the node editor, retain addition of the node or the connection information to a node indicating the first group, as the content of the edit additionally performed.

26. The data editing apparatus according to claim 22, wherein the elements are in-game objects, the first group is a group including at least one node among at least one node associated with a first object, and the node and the connection information included in the second group are associated with a second object.

27. The data editing apparatus according to claim 26, wherein the processor is configured to display the node or the connection information on which the second edit has been performed, on the node editor in a display form different from that of a node or connection information on which the second edit has not been performed.

28. The data editing apparatus according to claim 26, wherein the processor is configured to on the basis of an operation input to the node editor, create a third group obtained by copying the second group as a copy source and including a node and connection information of the node respectively corresponding to the node and the connection information of the node included in the second group, and retain the node or the connection information included in the third group as a content of an edit additionally performed on the node or the connection information included in the second group.

* * * * *